United States Patent
Tani

(10) Patent No.: US 6,792,413 B2
(45) Date of Patent: Sep. 14, 2004

(54) DATA PROCESSING APPARATUS AND METHOD, RECORDING MEDIUM, AND PROGRAM

(75) Inventor: Jun Tani, Tokyo (JP)

(73) Assignee: Sony Corporation, Tokyo (JP)

( * ) Notice: Subject to any disclaimer, the term of this patent is extended or adjusted under 35 U.S.C. 154(b) by 342 days.

(21) Appl. No.: 10/072,333

(22) Filed: Feb. 6, 2002

(65) Prior Publication Data

US 2002/0178131 A1 Nov. 28, 2002

(30) Foreign Application Priority Data

Feb. 8, 2001 (JP) ........................................ 2001-031788

(51) Int. Cl.[7] .............................................. G06F 15/18
(52) U.S. Cl. .......................................... 706/30; 706/16
(58) Field of Search ..................................... 706/30, 16

(56) References Cited

U.S. PATENT DOCUMENTS

| | | | | |
|---|---|---|---|---|
| 5,182,794 A | * | 1/1993 | Gasperi et al. ............... | 706/25 |
| 5,485,545 A | * | 1/1996 | Kojima et al. ................ | 706/23 |
| 5,649,065 A | * | 7/1997 | Lo et al. ........................ | 706/22 |
| 5,732,382 A | * | 3/1998 | Puskorius et al. ........... | 701/110 |
| 5,828,812 A | * | 10/1998 | Khan et al. ..................... | 706/2 |
| 6,041,299 A | * | 3/2000 | Schuster et al. ............. | 704/232 |
| 6,199,057 B1 | * | 3/2001 | Tawel ............................ | 706/30 |
| 6,434,084 B1 | * | 8/2002 | Schultz ......................... | 367/81 |
| 6,434,541 B1 | * | 8/2002 | Tawel et al. .................. | 706/30 |
| 6,611,824 B1 | * | 8/2003 | Ganesh et al. ................ | 706/22 |

FOREIGN PATENT DOCUMENTS

JP WO 03/096270 A1 * 1/2003

* cited by examiner

*Primary Examiner*—George B. Davis
(74) *Attorney, Agent, or Firm*—Frommer Lawrence & Haug LLP; William S. Frommer

(57) ABSTRACT

This invention provides a data processing apparatus which can store and recall more complicated time-series data than those processed in related art technologies. In the data processing apparatus, a recurrent neural network (RNN) of higher layer generates long-period parameter and supplies it to an input layer of RNN of lower layer via a computing block. The RNN uses this input as a parameter and computes short-period input.

10 Claims, 11 Drawing Sheets

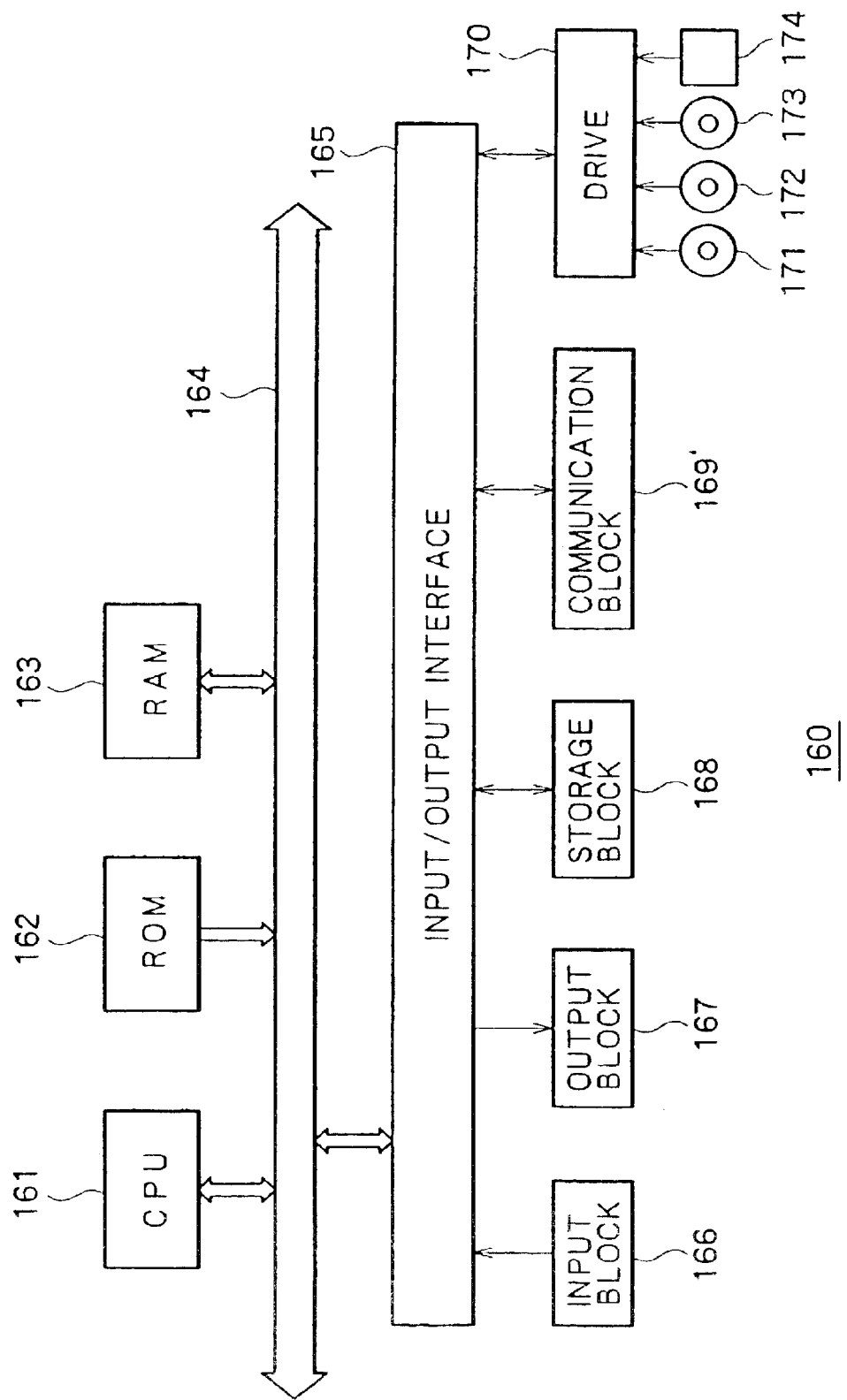

DATA PROCESSING APPARATUS AND METHOD, RECORDING MEDIUM, AND PROGRAM

BACKGROUND OF THE INVENTION

The present invention relates generally to a data processing apparatus and method, a recording medium, and a program and, more particularly, to a data processing apparatus and method, a recording medium, and a program which can easily and infallibly store and recall complicated time-series data.

The applicant hereof disclosed in Japanese Patent Laid-open No. Hei 11-126198 a technology of generating time-series data by use of a neural network of recurrent type.

In the disclosed technology, as shown in FIG. 1, the apparatus is basically configured with a lower-layer network having recurrent neural networks (RNNs) 1-1 through 1-n and a higher-layer network having recurrent neural networks RNNs 11-1 through 11-n.

In the lower-layer network, the outputs of the RNNs 1-1 through 1-n are supplied to a combining circuit 3 via respective gates 12-1 through 12-n.

In the higher-layer network, the outputs of the RNNs 11-1 through 11-n are supplied to a combining circuit 13 via respective gates 12-1 through 12-n. In accordance with the a combined output from the combining circuit 13 of the higher-layer network, the on/off operations of gates 2-1 through 2-n of the lower-layer network are controlled.

The RNNs 1-1 through 1-n of the lower-layer network generate patterns P1 through Pn respectively. On the basis of the output of the combining circuit 13 of the higher-layer network, predetermined one of the gates 2-1 through 2-n of the lower-layer network is turned on/off, thereby causing the combining circuit 3 to selectively output one of the patterns P1 through Pn generated by the predetermined one of the RNNs 1-1 through 1-n.

Consequently, as shown in FIG. 2 for example, patterns which change with time can be generated by generating pattern P1 for a predetermined period and then pattern P2 for another predetermined period and then pattern P1 again for still another predetermined period, for example.

However, in the above-mentioned disclosed technology, the gates 2-1 through 2-n executes a so-called winner-take-all operation, so that it is difficult to store and generate complicated patterns.

SUMMARY OF THE INVENTION

It is therefore an object of the present invention to provide a data processing apparatus and method, a recording medium, and a program which are capable of easily and infallibly store and generate patterns even though they are complicated.

In carrying out the invention and according to a first aspect thereof, there is provided a data processing apparatus including: processing means including a first recurrent neural network for applying a predetermined nonlinear function to data inputted from an input terminal, the processing means receiving first data constituted by time-series data and second data constituted by time-series data at the input terminal of the first recurrent neural network to execute the processing; generating means including a second recurrent neural network for generating the second data by applying a predetermined nonlinear function to data inputted from an input terminal; and computing means for executing computation on the second data and third data generated by error back propagation by the first recurrent neural network to generate fourth data.

Preferably, in the above-mentioned data processing apparatus, the generating means generates the second data which change with a longer period than that of the first data.

Preferably, in the above-mentioned data processing apparatus, the computing means executes computation by use of data generated by error back propagation by the first recurrent neural network at the time of learning.

Preferably, in the data processing apparatus, the computing means executes the computation by use of a sigmoid function.

Preferably, in the data processing apparatus, the computing means executes, at the time of learning, a computation including a first computation using data generated by error back propagation by the first recurrent neural network and a second computation for smoothing in an adjacent space-time.

Preferably, in the data processing apparatus, the computing means executes, at the time of future prediction, a computation including a first computation of the second data and a second computation for smoothing in an adjacent space-time.

Moreover, this computing means may execute, at the time of recalling the past, a computation including a first computation of the second data, a second computation using data generated by error back propagation by the first recurrent neural network, and a third computation for smoothing in an adjacent space-time.

In carrying out the invention and according to a second aspect thereof, there is provided a data processing method including: a processing step for performing processing by using a first recurrent neural network for applying a predetermined nonlinear function to data inputted from an input terminal, the processing step receiving, at the input terminal of the first recurrent neural network, first data constituted by time-series data and second data constituted by time-series data to execute the processing of the first and second data; a generating step for performing processing by using a second recurrent neural network for generating the second data by applying a predetermined nonlinear function to data inputted from an input terminal; and a computing step for executing computation on the second data and third data generated by error back propagation by the first recurrent neural network to generate fourth data.

In carrying out the invention and according to a third aspect thereof, there is provided a recording medium recording a computer-readable program, including: a processing step for performing processing by using a first recurrent neural network for applying a predetermined nonlinear function to data inputted from an input terminal, the processing step receiving, at the input terminal of the first recurrent neural network, first data constituted by time-series data and second data constituted by time-series data to execute the processing of the first and second data; a generating step for performing processing by using a second recurrent neural network for generating the second data by applying a predetermined nonlinear function to data inputted from an input terminal; and a computing step for executing computation on the second data and third data generated by error back propagation by the first recurrent neural network to generate fourth data.

In carrying out the invention and according to a fourth aspect thereof, there is provided a program for causing a computer to execute: a processing step for performing processing by using a first recurrent neural network for applying a predetermined nonlinear function to data inputted from an input terminal, the processing step receiving, at the input terminal of the first recurrent neural network, first data constituted by time-series data and second data constituted by time-series data to execute the processing of the first and second data; a generating step for performing processing by using a second recurrent neural network for generating the second data by applying a predetermined nonlinear function to data inputted from an input terminal; and a computing step for executing computation on the second data and third data generated by error back propagation by the first recurrent neural network to generate fourth data.

In the data processing apparatus and method and program associated with the present invention, the second data generated by the second recurrent neural network is supplied to the input terminal of the first recurrent neural network to be processed together with the first data.

BRIEF DESCRIPTION OF THE DRAWINGS

These and other objects of the invention will be seen by reference to the description, taken in connection with the accompanying drawing, in which:

FIG. 13 is a block diagram illustrating a configuration of a personal computer practiced as one embodiment of the present invention.

DETAILED DESCRIPTION OF THE PREFERRED EMBODIMENTS

Figure 1:
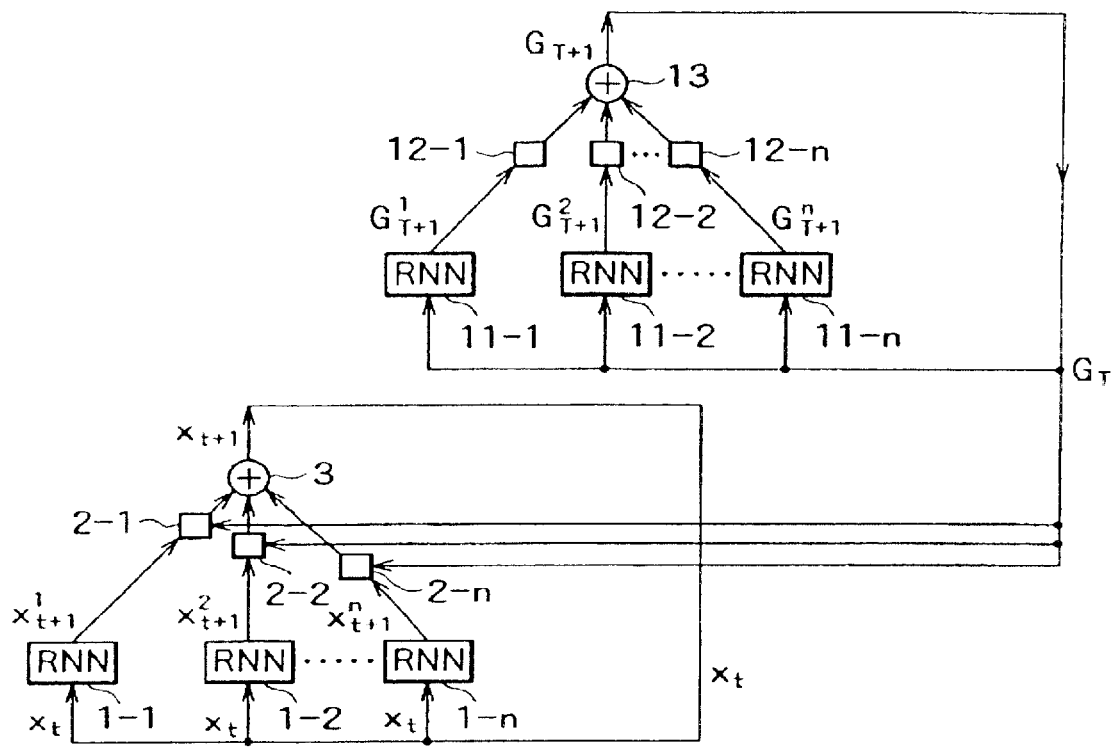
FIG. 1 is a block diagram illustrating a configuration of a related-art data processing apparatus.
Figure 2:
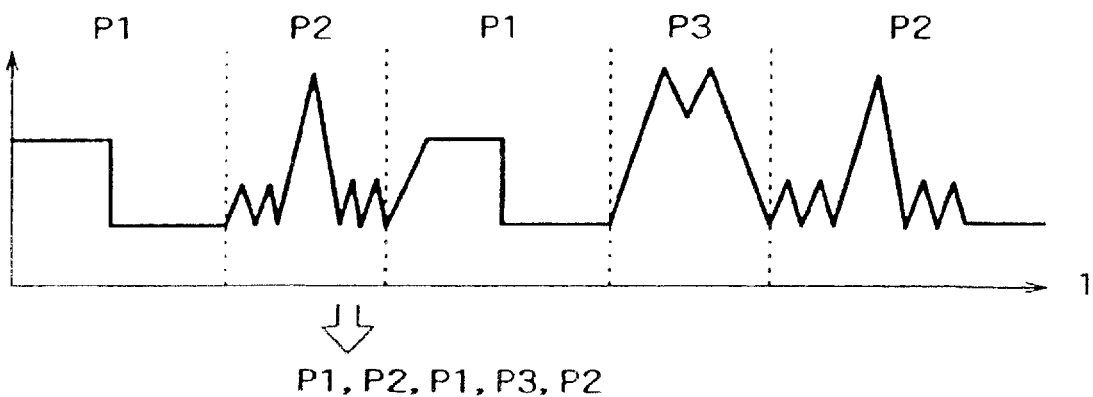
FIG. 2 is an example of changes of patterns generated by the data processing apparatus shown in FIG. 1.

This invention will be described in further detail by way of example with reference to the accompanying drawings. Now referring to FIG. 3, there is shown an exemplary configuration of a data processing apparatus to which the present invention is applied. Basically, this apparatus a recurrent neural network (RNN) 41 on the lower layer and a RNN 42 on the higher layer. A computing block 43 is arranged between the RNN 41 and the RNN 42.

The RNN 41 has an input layer 51 consisting of a given number of neurons, into which data to be processed (for example, an input corresponding to each sensor mounted on a robot or an input corresponding to the status of a motor) as data $x_t$.

Data $X_T$ generated by the RNN 42 are also inputted in the input layer 51 via the computing block 43 as data $X_t$.

An intermediate layer 52 performs computation processing (computation based on a nonlinear function) corresponding to a predetermined weight coefficient on the data $x_t$ and $X_t$ inputted from the input layer 51 and outputs a result to an output layer 53 consisting of a given number of neurons. The output layer 53 outputs $x^*_{t+1}$ as a result of the computation by the RNN 41 on the basis of the predetermined nonlinear function.

A part of the output from the output layer 53 is fed back to the input layer 51 as context $C_{t+1}$ representative of an internal state of the RNN 41.

This output $x^*_{t+1}$ is supplied to an error computing block 61 as required. The error computing block computes a difference between output $x^*_{t+1}$ and teacher data $x_{t+1}$ supplied from an apparatus, not shown, to generate a predictive error component. The generated predictive error component is supplied from the output layer 53 to the input layer 51 via the intermediate layer 52 (namely, processing based on so-called error back propagation is performed). At this moment, output $X_t$ from the input layer 51 is supplied to the computing block 43.

The RNN 42 is also configured in basically the same manner as the RNN 41. Namely, data $X_T$ inputted from an input layer 71 is computed by an intermediate layer 72 on the basis of a predetermined weight coefficient (computation based on a nonlinear function), a result being outputted from an output layer 73 as output $X^*_{T+1}$.

A part of the output from the output layer 73 is fed back to the input layer 71 as content $C_{T+1}$.

An error computing block 81 subtracts data $X_{T+1}$ supplied from the computing block 43 from output $X^*_{T+1}$ outputted from the output layer 73 to generate a predictive error difference. This predictive error difference is supplied to the input layer 71 via the intermediate layer 72 (namely, processing based on error back propagation is performed).

The computing block 43 executes a computation (namely, a computation based on steepest descent method) based on equation (1) which includes the computations of first through third terms. The first term is the computation based on data $X_T$ generated by the RNN 42. The second term is the computation which includes component $X_{bpt}$ generated by the error back propagation of the RNN 41. The third term is the computation for smoothing (or filtering) in an adjacent space-time.

$$dXU_t = \underbrace{k_h \cdot (X_T - 0.5)}_{\text{1st term}} + k_{bp} \cdot \underbrace{\sum_{t-\frac{1}{2}}^{t+\frac{1}{2}} dX_{bpt}}_{\text{2nd term}} + \underbrace{k_{nb}(XU_{t+1} - XU_t + XU_{t-1} - XU_t)}_{\text{3rd term}} \quad (1)$$

$XU_t$ in equation (1) above is represented by equation (2). $X_t$ is obtained by processing $XU_t$ in equation (2) by the sigmoid function of equation (3).

$$\begin{cases} dlXU_t = \varepsilon \cdot dXU_t + \text{momentum} \cdot dlXU_t \\ XU_t = XU_t + dlXU_t \end{cases} \quad (2)$$

$$X_T = \text{sigmoid}(X_t) \quad (3)$$

Figure 4:
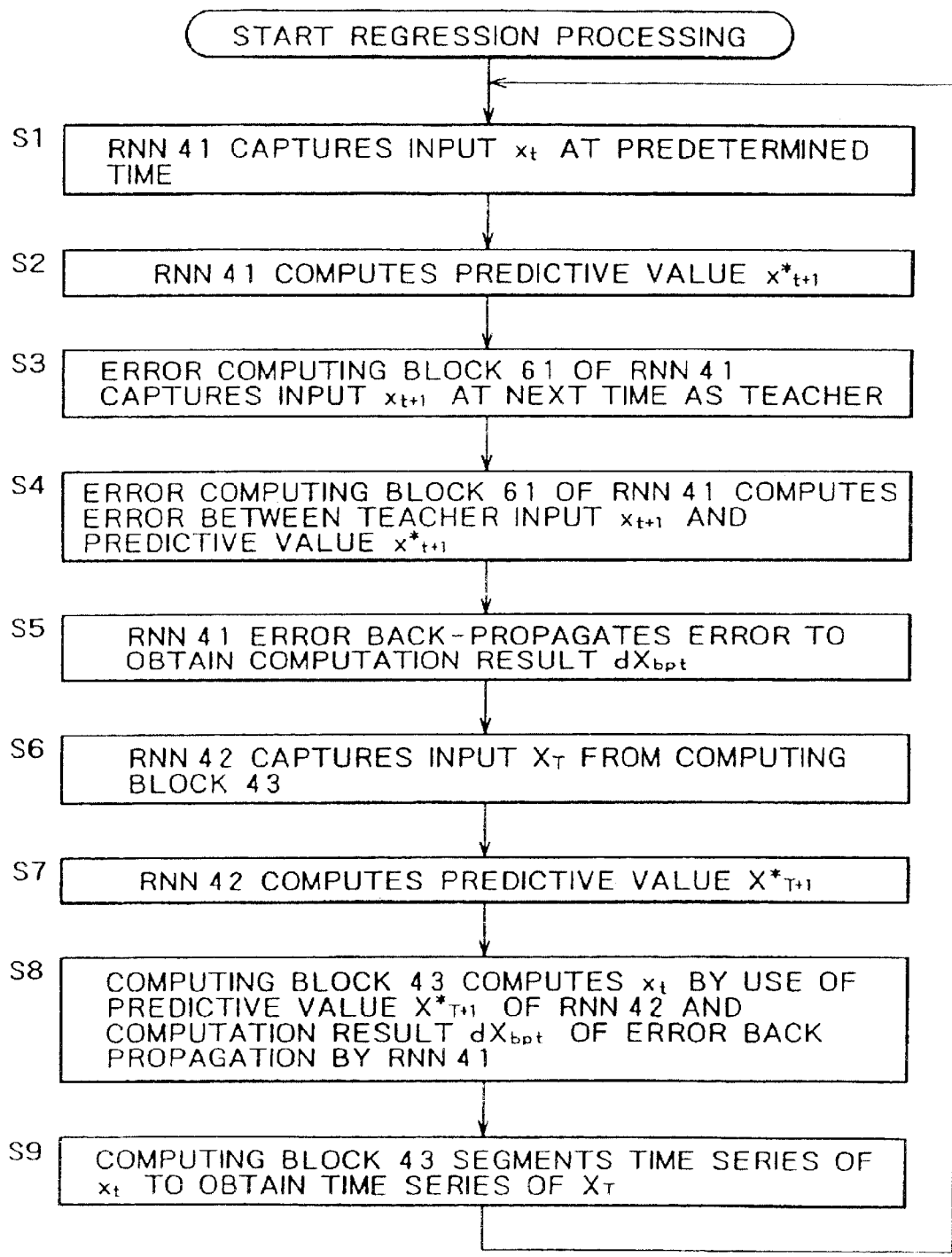
FIG. 4 is a flowchart describing an operation of the data processing apparatus shown in FIG. 3.
Figure 8:
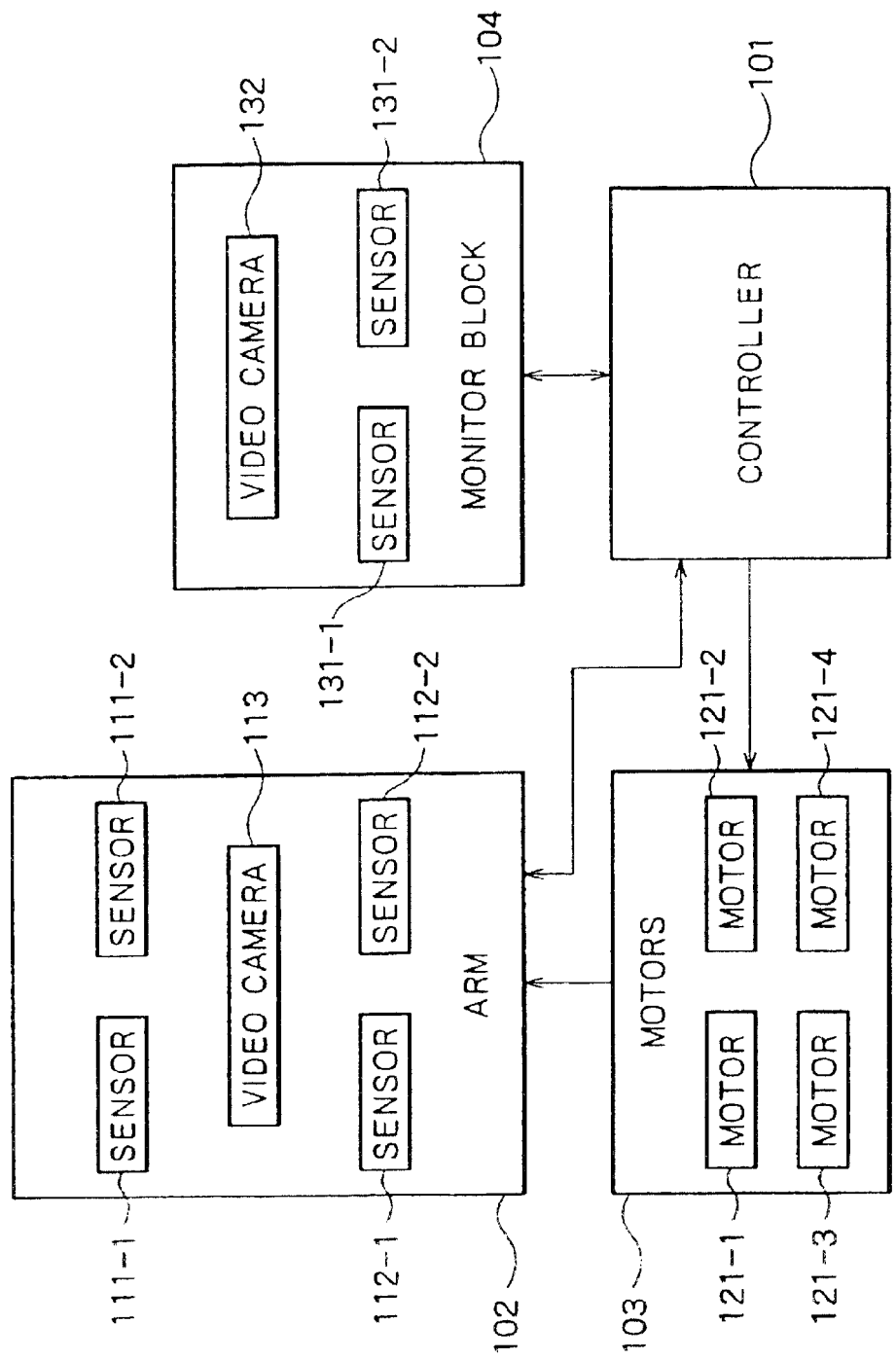
FIG. 8 is a block diagram illustrating a configuration of a robot apparatus practiced as one embodiment of the present invention.

The following describes, by use of the above-mentioned apparatus, an operation for controlling a robot apparatus 91 (with reference to FIG. 8). The processing in the following example consists of a regression process for recalling the past and a process for predicting the future to be executed after the regression. First, the regression process will be described with reference to the flowchart shown in FIG. 4.

In step S1, the RNN 41 captures input $x_t$ of predetermined timing t. At the same time, the RNN 41 captures data $X_t$ outputted from the computing block 43. Data $X_t$ are data $X_T$ outputted by the computing block 43 from the output layer 73 of the RNN 42. Namely, $X_t = X_T$.

In step S2, the RNN 41 computes predictive value $x^*_{t+1}$ from captured data $x_t$ and $X_t$.

Namely, at this moment, the RNN 41, as expressed in equation (4) below, applies predetermined nonlinear function f to data $x_t$ with $X_t$ as a parameter.

$$X_{t+1} = f(x_t, X_t, c_t) \quad (4)$$

It should be noted that, in equation (4) above, maker "*" indicative of a predictive value is omitted.

In step S3, the error computing block 61 of the RNN 41 captures input $x_{t+1}$ of the next timing as teacher data. In step S4, the error computing block 61 computes a difference between predictive value $x^*_{t+1}$ computed in step S2 and teacher data $x_{t+1}$ captured in step S3 to generate a predictive error.

In step S5, the RNN 41 executes processing based on so-called error back propagation by use of the predictive error obtained in step S4. Namely, the predictive error is captured from the output layer 53, a predetermined weight coefficient is applied to the predictive value in the intermediate layer 52, and the resultant value is outputted from the input layer 51. As a result of this error back propagation, data $dX_{bpt}$ is supplied to the computing block 43.

In step S6, the RNN 42 captures data $X_T$ supplied from the computing block 43. In step S7, the RNN 42 computes predictive value $X^*_{T+1}$.

At this moment, the RNN 42 applies nonlinear function F expressed in equation 5 below to data $X_T$ to compute data $X_{T+1}$.

$$X_{T+1} = F(X_T, C_T) \quad (5)$$

It should be noted that, in equation (5) above, marker "*" indicative of a predictive value is omitted.

In step S8, the computing block 43 applies a sigmoid function as expressed in equation (3) to computation result $dX_{bpt}$ inputted from the input layer 51 to compute data $X_T$ consisting of data of 1 or 0, supplying a result to the error computing block 81.

In step S8, the computing block 43 computes $dXU_t$ by use of equation (1) on the basis of data $dX_{bpt}$ obtained in step S5 and predictive value $X^*_{T+1}$ obtained in step S7. At this moment, all of the first through third terms of equation (1) are used.

Further, the computing block 43 executes a computation through the steepest descent method by use of equation (2) to obtain $X_t$.

In step S9, the computing block 43 applies the sigmoid function shown in equation (3) to time-series data $X_t$ for segmentation to obtain time-series data $X_T$.

For example, if 0.5 is used as a threshold, data as time-series data $x_t$ (0.2, 0.4, 0.3, 0.6, 0.7, 0.8, 0.4, 0.3) become data as time-series data $X_T$ (0, 0, 0, 1, 1, 1, 0, 0).

The above-mentioned processing operations of steps S1 through S9 are repeatedly executed.

When the regression processing for recalling the past has been completed, plan processing for predicting the future is executed. This processing is generally the same as that shown in FIG. 4 except for error back propagation, which is not executed. Therefore, the processing operations of steps S3 through S5 are skipped. In the processing in step S8, a computation using only predictive value $X^*_{T+1}$ of the RNN 42 is executed ($dX_{bpt}$, which is the error back propagation computing result of the RNN 41 is not used). Namely, the processing using the first and third terms of equation (1) is executed (the second term is not computed).

Figure 5A:
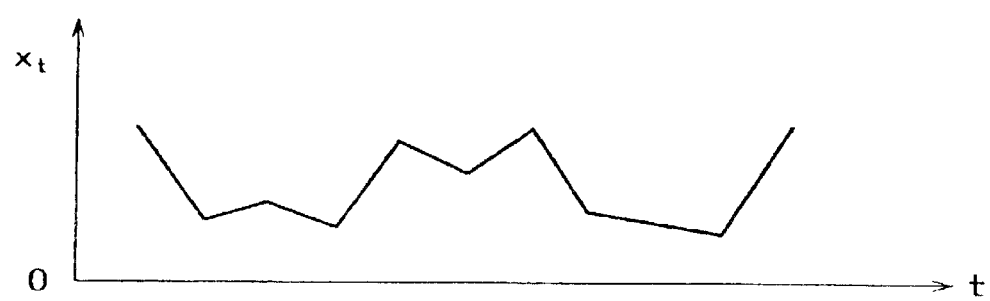
FIGS. 5A and 5B schematically illustrate an example of segmentation.
Figure 5B:
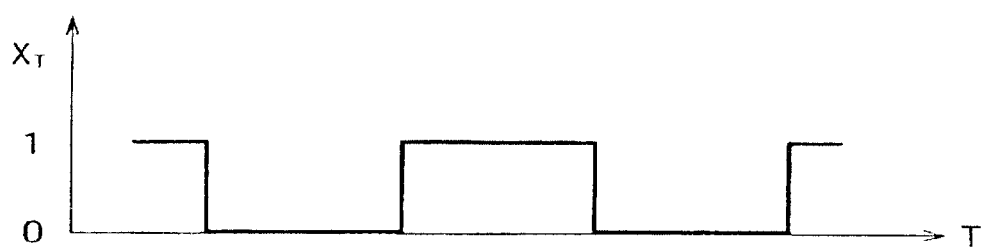

FIGS. 5A and 5B schematically illustrate the processing of step S9. Data $x_t$ shown in FIG. 5A changes to a predetermined value every time t, while data $X_T$ is converted to 1 or 0 by executing threshold processing on data $x_t$ with a predetermined value as shown in FIG. 5B.

Figure 6:
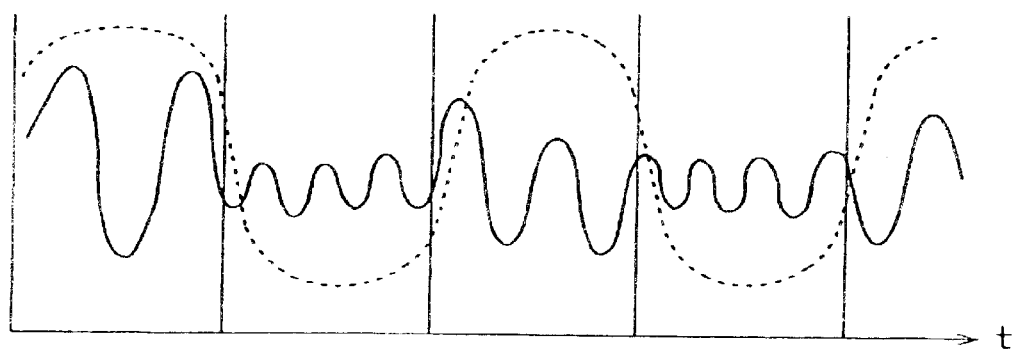
FIG. 6 schematically illustrates the operation of the data processing apparatus shown in FIG. 3.

FIG. 6 schematically illustrates the change (the solid line in FIG. 6) in data $x_t$ generated by the RNN 41 and data $X_T$ (the dashed line in FIG. 6) generated by the RNN 42. As shown, data $x_t$ changes at a comparatively short period, while data $X_T$ changes at a comparatively short period. Namely, a function (or a parameter) having a comparatively short period can be specified by the RNN 41 while a function having a comparatively long period can be specified by the RNN 42, by both of which complicated time-series patterns can be stored.

Figure 3:
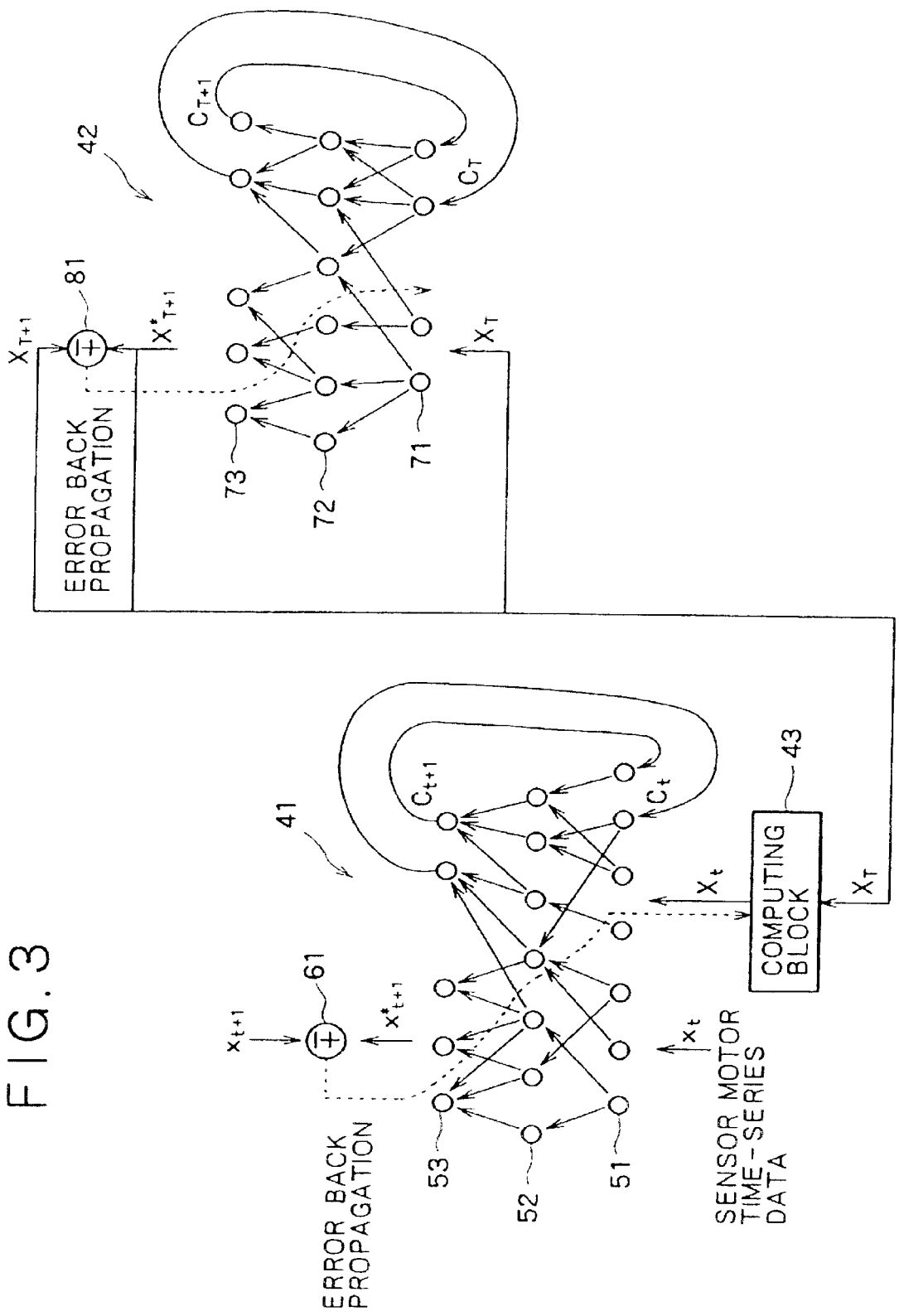
FIG. 3 is a block diagram illustrating a configuration of a data processing apparatus practiced as one embodiment of the present invention.

Namely, in the example shown in FIG. 3, data $X_T$ generated by the RNN 42, which is the higher-layer processing module is directly supplied to the input terminal of the RNN 41, which is the lower-layer processing module, so that more complicated patterns can be learned and stored by the RNN 41 and the RNN 42.

On the contrary, in the related-art example shown in FIG. 1, the output of the upper layer is not supplied to the RNN, which is a lower-layer processing module; but the output is used only for controlling a RNN output selecting gate, so that it is difficult to learn and store complicated patterns.

Figure 7:
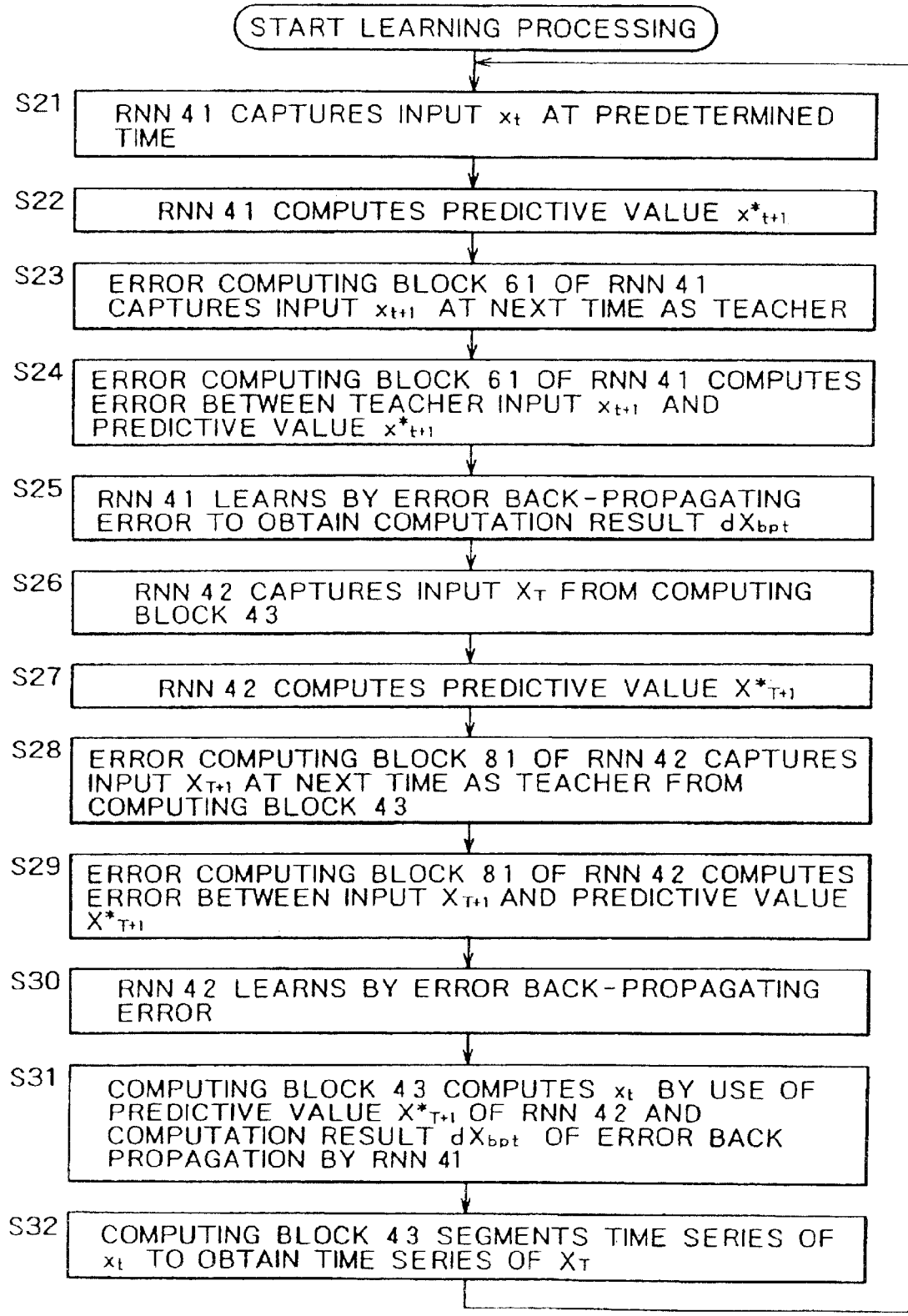
FIG. 7 is a flowchart describing an operation at the time of learning of the data processing apparatus shown in FIG. 3.

The following describes the learning processing of the apparatus shown in FIG. 3 with reference to the flowchart shown in FIG. 7. The processing operations of steps S21 through S27 and steps S31 and S32 are basically the same as those of steps S1 through S9 shown in FIG. 4. However, in step S25, the RNN 41 executes learning by error back propagation.

As shown in FIG. 7, processing operations of steps S28 through S30 are inserted between steps S27 and S31. The processing in the inserted steps is for the learning of the RNN 42.

Now, in step S28, the error computing block 81 of the RNN 42 captures input $X_{T+1}$ of a next timing from the computing block 43 as teacher data.

In step S29, the error computing block 81 computes an error between input $X_{T+1}$ as teacher data and predictive value $X^*_{T+1}$. In step S30, the RNN 42 learns, by error back propagation, the predictive error generated in step S29.

The above-mentioned processing operations of steps S21 through S32 are repeatedly executed to set the weight coefficient of each neuron to a predetermined value, thereby specifying functions f and F shown in equations (4) and (5) respectively.

FIG. 8 illustrates an exemplary configuration of a robot apparatus practiced as one embodiment of the present invention. A robot apparatus 91 is constituted by a controller 101 incorporating the data processing apparatus shown in FIG. 3, an arm 102 which acts on an object, a motor group 103 for driving the arm 102, and a monitor block 104 for monitoring the object held by the arm 102.

The motor group 103 incorporates four motors 121-1 through 121-4, by which corresponding sections of the arm 102 are driven.

Figure 9:
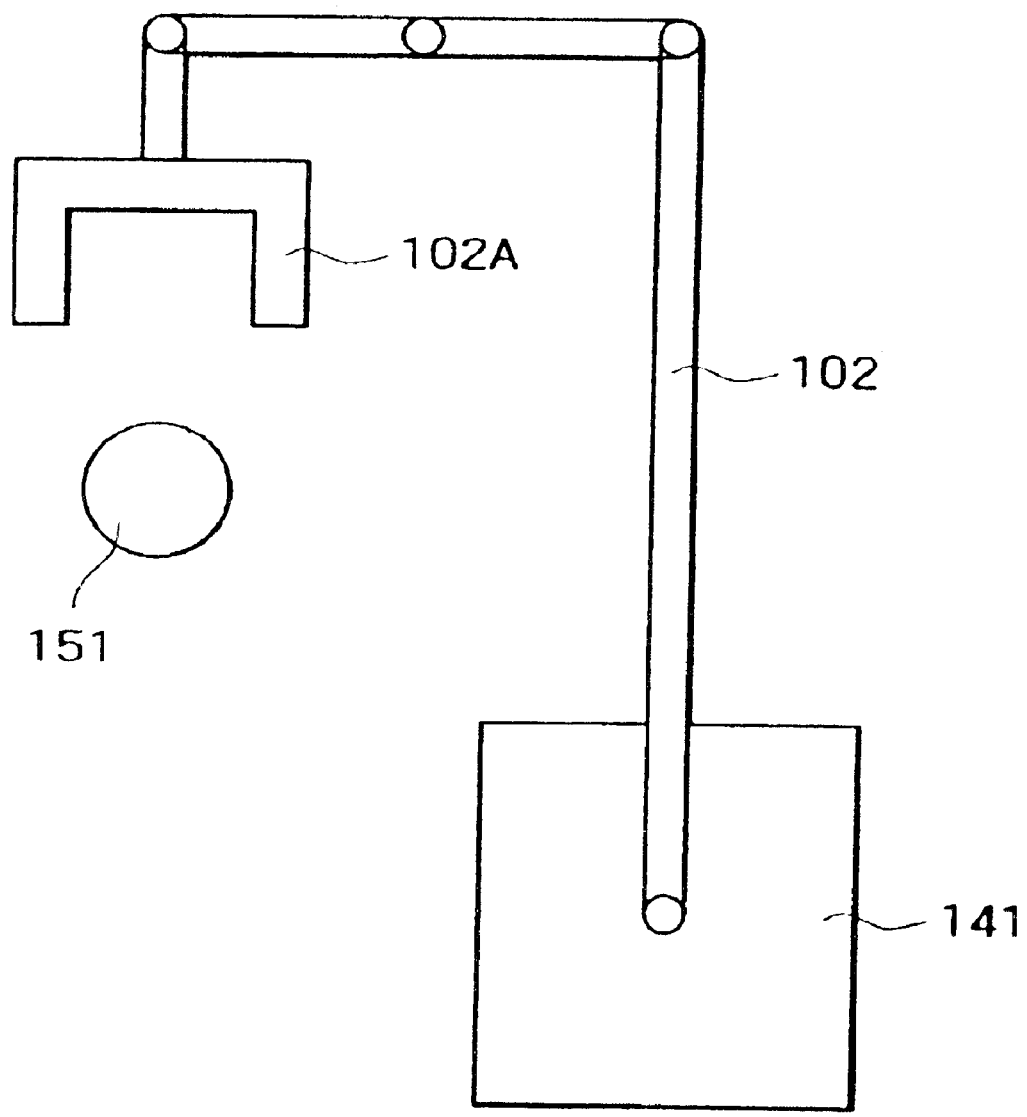
FIG. 9 is a schematic diagram illustrating an external configuration of the robot apparatus shown in FIG. 8.

The arm 102 has a hand 102A (FIG. 9) at the tip thereof, the hand 102A having left-side and right-side sensors 112-1 and 112-2 for sensing the touch to an object 151 (FIG. 9). The hand 102A of the arm 102 also has a video camera 113 at the tip thereof for imaging the object 151. A position of the object 151 represented by coordinates x and y in the image captured by the video camera 113 is sensed by sensors 111-1 and 111-2.

The monitor block 104 has a video camera 132 for monitoring the object 151 and sensors 131-1 and 131-2 for sensing coordinates x and y of the object 151 captured through the video camera 132.

As shown in FIG. 9, the sections other than the arm 102 having the handle 102A are built inside a main body 141. The arm 102, driven by the motor group 103, holds the object 151 by the hand 102A mounted at the tip thereof to pull the object 151 toward the main body 141. The operation is controlled by the controller 101 having the configuration shown in FIG. 3.

Figure 10:
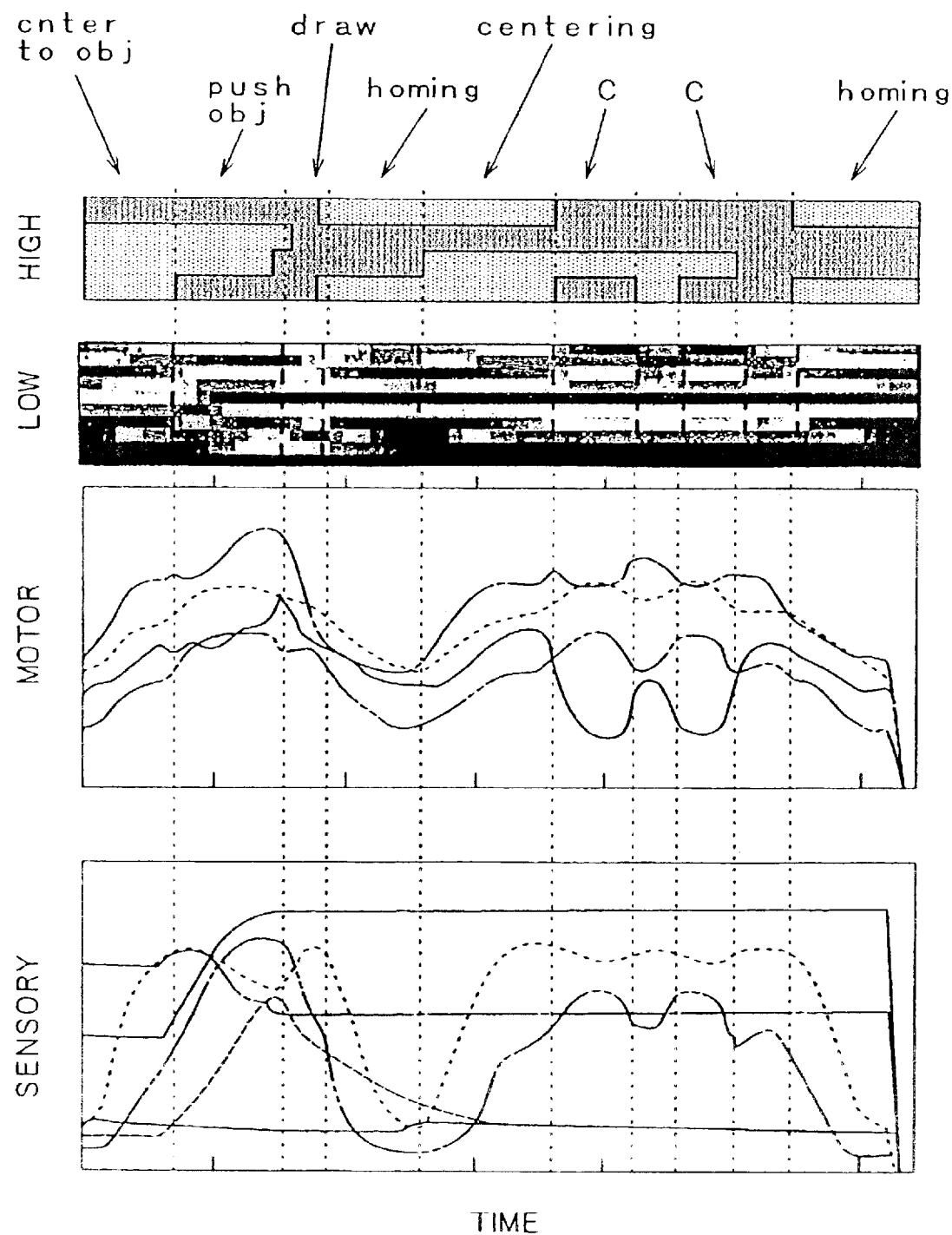
FIG. 10 illustrates an example of test results of the robot apparatus shown in FIG. 8.
Figure 11:
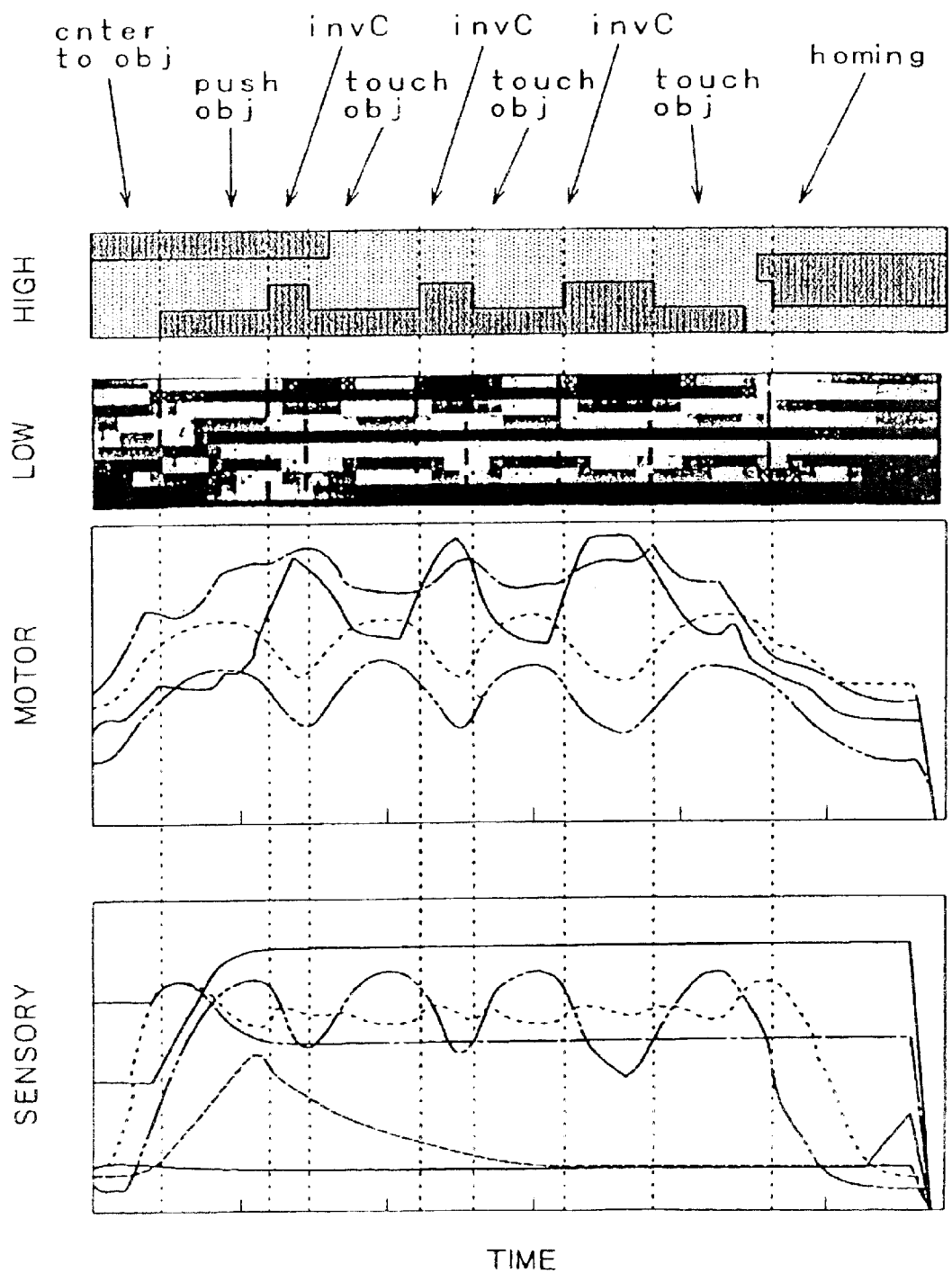
FIG. 11 illustrates another example of test results of the robot apparatus shown in FIG. 8.

FIGS. 10 and 11 illustrate test operation results obtained on the robot apparatus 91 shown in FIGS. 8 and 9. FIG. 10 shows an example of first sequence processing and FIG. 11 shows an example f second sequence processing.

In these figures, each lateral axis represents time. "high" of the vertical axis represents data $X_T$ generated by the RNN 42. In this example, data $X_T$ is represented in 4 bits and each line of "high" represents whether each bit is "1" or "0".

"Low" represents context $C_T$ of the RNN 42. In this example, the context is represented in 10 bits.

"Motor" represents the operations of the four motors 121-1 through 121-4 in four respective lines.

"Sensory" represents the outputs of six sensors 111-1, 111-2, 112-1, 112-2, 131-1, and 131-2 in respective six lines.

To be specific, "motor" and "sensory" are outputted from the output layer 53 of the RNN 41.

"cnter to obj" represents an operation in which the arm 102 approaches the object 151 placed on table (not shown) at the center thereof. "push obj" represents an operation in which the hand 102A pushes the object 151. "draw" represents an operation in which the arm 102 draws the object 151 toward the main body 141. "homing" represents an operation in which the arm 102 moves to the home position on an end of the table. "centering" represents an operation in which the arm 102 moves to the center. "C" represents that the arm 102 takes a shape of alphabetical letter "C." "invC" represents that the arm 102 takes a shape of inverted alphabetical letter "C." "touch obj" represents an operation in which the hand 102A touches the object 151.

In each of the sequences shown in FIGS. 10 and 11, segmentation is made in units of processing having comparatively long periods such as "cnter to obj," "push obj," "draw," "homing," "centering," "C," "invC," and "touch obj" especially as obviously seen from the outputs of the six sensors.

This also can cause only the RNN 42 to relearn, leaving the RNN 41 as it is (namely, causing the RNN 41 not to newly learn), thereby combining the operation of the RNN 42 with an operation learned by the RNN 41 in the past to effect a new operation.

Figure 12:
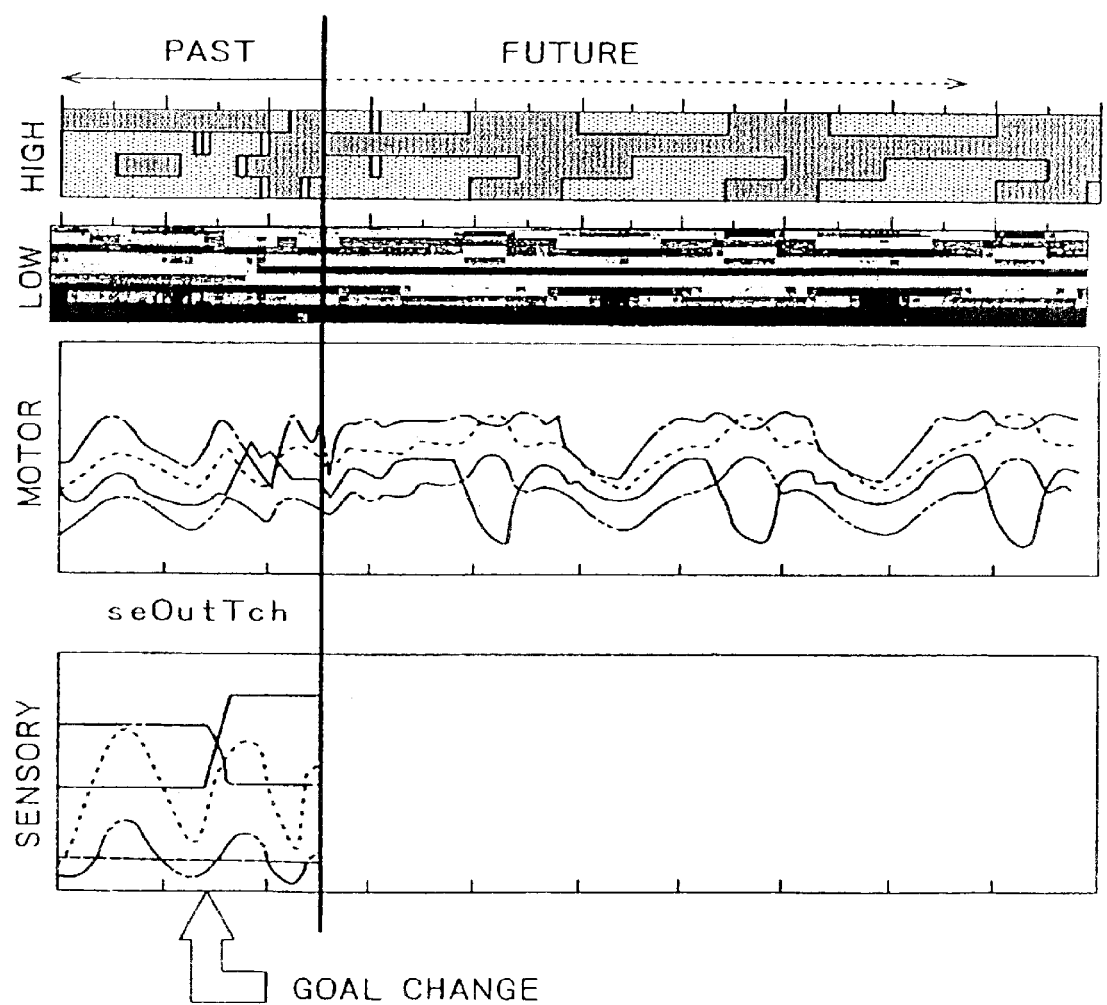
FIG. 12 illustrates further another example of test results of the robot apparatus shown in FIG. 8.

Specifying the above-mentioned functions f and F for the RNN 41 and the RNN 42 respectively can execute only recalling or predictive processing without executing actual processing. FIG. 12 shows operations in which future processing is predicted and past processing is recalled. In this example, in the past processing, teacher data (seOutTch) of new sensor motor data is supplied halfway through control to change goals (in FIG. 12, the timing of this operation is shown as "goal change").

As described, the past recalling processing is executed by use of the first, second, and third terms of equation (1), while the future predictive processing is executed by use of only the first and third terms.

Executing computational processing by use of equation (1) can prevent the control processing from being failed due to the generation of external interference during operation, for example.

To be more specific, normally, if an unpredictable external interference occurs, the subsequent control operation often fails. However, when the control processing based on equation (1) is executed, if a man interferes the control processing for the arm 102 to draw the object 151 by holding the same by the hand for example, control is still executed for drawing the object 151. At this moment, this control cannot be eventually achieved because the man holds the arm 102. However, if the man lets the arm 102 loose, then the operation for drawing the object 151 can be restarted.

The above-mentioned sequences of processing operations can be executed by software as well as hardware. In the software approach, a personal computer 160 as shown in FIG. 13 is used.

Referring to FIG. 13, a CPU (Central Processing Unit) 161 executes various processing operations as instructed by programs stored in a ROM (Read Only Memory) 162 or programs loaded from a storage block 168 into a RAM (Random Access Memory) 163. The RAM 163 also stores from time to time data necessary for the CPU 161 to execute various processing operations for example.

The CPU 161, the ROM 162, and the RAM 163 are interconnected through a bus 164. This bus 164 is also connected to an input/output interface 165.

The input/output interface 165 is connected to an input block 166 which includes a keyboard and a mouse for example, a display monitor constituted by a CRT or LCD, an output block 167 which is a speaker for example, the storage block 168 which is a hard disk unit for example, and a communication block 169 constituted by a modem and a terminal adapter for example. The communication block 169 executes communication processing via a network.

The input/output interface 165 is also connected to a drive 170 as required on which a magnetic disk 171, an optical disk 172, a magneto-optical disk 173, or a semiconductor memory 174 is loaded from time to time. Computer programs retrieved from these recording media are stored in the storage block 168 as required.

If the above-mentioned sequence of processing operations is executed by software, the programs constituted the necessary software are installed from the connected network or the above-mentioned recording media onto the personal computer 160.

These recording media are constituted not only by package media of the magnetic disk 171 (including floppy disk), the optical disk 172 (including CD-ROM (Compact Disk Read Only Memory) and DVD (Digital Versatile Disk)), the magneto-optical disk 173 (including MD (Mini Disk)), or the semiconductor memory 174 in which the necessary programs are recorded and which are distributed separately from the apparatus main, but also by the ROM 162 recorded with programs or a hard disk recorded with programs contained in the storage block 168 which is provided to the user as assembled in the apparatus main beforehand.

It should be noted that herein the steps describing a program recorded on a recording medium include not only the processing to be executed in a time-series manner in accordance with the described sequence but also the processing which is executed in parallel or discretely, not always in a time-series manner.

As described and according to the data processing apparatus and method and program associated with the present invention, the second data generated by the second recurrent neural network are supplied to the input terminal of the first recurrent neural network for processing together with the first data, thereby allowing the learning and storing of complicated time-series patterns and recalling the stored patterns.

While the preferred embodiments of the present invention have been described using specific terms, such description is for illustrative purposes only, and it is to be understood that changes and variations may be made without departing from the spirit or scope of the appended claims.

What is claimed is:

1. A data processing apparatus comprising:

processing means including a first recurrent neural network for applying a predetermined nonlinear function to data inputted from an input terminal, said processing means receiving first data constituted by time-series data and second data constituted by time-series data at said input terminal of said first recurrent neural network to execute the processing;

generating means including a second recurrent neural network for generating said second data by applying a predetermined nonlinear function to data inputted from an input terminal; and computing means for executing computation on said second data and third data generated by error back propagation by said first recurrent neural network to generate fourth data.

2. The data processing apparatus according to claim 1, wherein said generating means generates said second data which change with a longer period than that of said first data.

3. The data processing apparatus according to claim 1, wherein said computing means executes computation by use of data generated by error back propagation by said first recurrent neural network at the time of learning.

4. The data processing apparatus according to claim 1, wherein said computing means executes said computation by use of a sigmoid function.

5. The data processing apparatus according to claim 1, wherein said computing means executes, at the time of learning, a computation including a first computation using data generated by error back propagation by said first recurrent neural network and a second computation for smoothing in an adjacent space-time.

6. The data processing apparatus according to claim 1, wherein said computing means executes, at the time of future prediction, a computation including a first computation of said second data and a second computation for smoothing in an adjacent space-time.

7. The data processing apparatus according to claim 1, wherein said computing means executes, at the time of recalling the past, a computation including a first computation of said second data, a second computation using data generated by error back propagation by said first recurrent neural network, and a third computation for smoothing in an adjacent space-time.

8. A data processing method comprising:

a processing step for performing processing by using a first recurrent neural network for applying a predetermined nonlinear function to data inputted from an input terminal, said processing step receiving, at said input terminal of said first recurrent neural network, first data constituted by time-series data and second data constituted by time-series data to execute the processing of said first and second data;

a generating step for performing processing by using a second recurrent neural network for generating said second data by applying a predetermined nonlinear function to data inputted from an input terminal; and a computing step for executing computation on said second data and third data generated by error back propagation by said first recurrent neural network to generate fourth data.

9. A recording medium recording a computer-readable program, comprising:

a processing step for performing processing by using a first recurrent neural network for applying a predetermined nonlinear function to data inputted from an input terminal, said processing step receiving, at said input terminal of said first recurrent neural network, first data constituted by time-series data and second data constituted by time-series data to execute the processing of said first and second data;

a generating step for performing processing by using a second recurrent neural network for generating said second data by applying a predetermined nonlinear function to data inputted from an input terminal; and a computing step for executing computation on said second data and third data generated by error back propagation by said first recurrent neural network to generate fourth data.

10. A program for causing a computer to execute:

a processing step for performing processing by using a first recurrent neural network for applying a predetermined nonlinear function to data inputted from an input terminal, said processing step receiving, at said input terminal of said first recurrent neural network, first data constituted by time-series data and second data constituted by time-series data to execute the processing of said first and second data;

a generating step for performing processing by using a second recurrent neural network for generating said second data by applying a predetermined nonlinear function to data inputted from an input terminal; and a computing step for executing computation on said second data and third data generated by error back propagation by said first recurrent neural network to generate fourth data.

* * * * *